US006470940B1

(12) United States Patent
Pu et al.

(10) Patent No.: US 6,470,940 B1
(45) Date of Patent: Oct. 29, 2002

(54) APPARATUS FOR DISTRIBUTING A RELEASE AGENT FOR USE IN THE MANUFACTURE OF LIGNO-CELLULOSIC COMPOSITE MATERIALS

(75) Inventors: Jianhua Pu, Watkinsville, GA (US); Robert Palardy, Commerce, GA (US); Steve Husted, Commerce, GA (US); Tim Smith, Commerce, GA (US)

(73) Assignee: J. M. Huber Corporation, Edison, NJ (US)

( * ) Notice: Subject to any disclaimer, the term of this patent is extended or adjusted under 35 U.S.C. 154(b) by 33 days.

(21) Appl. No.: 09/702,999

(22) Filed: Oct. 31, 2000

(51) Int. Cl.$^{7}$ .......................... B05B 15/04; B32B 31/20

(52) U.S. Cl. ....................... 156/356; 156/390; 156/580; 118/690

(58) Field of Search ................................ 156/356, 390, 156/357, 362, 358, 580; 118/682, 683, 684, 689, 690; 134/15; 222/57

(56) References Cited

U.S. PATENT DOCUMENTS 3,877,645 A 4/1975 Oligschlaeger
4,110,397 A 8/1978 Wooler
4,396,673 A 8/1983 Ball et al.
4,752,637 A * 6/1988 Israel ......................... 524/702
5,215,253 A * 6/1993 Saidman et al. .............. 239/61
5,538,676 A * 7/1996 Bielfeldt ..................... 264/109
5,908,496 A 6/1999 Singule et al.

* cited by examiner

*Primary Examiner*—Richard Crispino
*Assistant Examiner*—George R Koch, III
(74) *Attorney, Agent, or Firm*—Carlos Nieves; David Mitchell Goodrich

(57) ABSTRACT

An apparatus for distributing a soap based release agent upon a surface comprising; a means for metering a controlled quantity of a liquid metallic soap into a pressurized water stream to form a pressurized aqueous solution having a controlled dilution ratio of soap to water, at least one manifold connected to receive the pressurized aqueous solution, and a plurality of nozzles mounted upon the manifold to uniformly distribute the pressurized liquid solution upon at least one surface. The surface may further be defined as a planar surface, moving unidirectional along a fixed path at a predetermined variable speed and defined by a surface area of length multiplied by width. The planar surface has a fixed width, wherein the surface area moving past a fixed point for a predetermined period of time is a function of the speed of the planar surface moving past the fixed point. At least one regulating means regulates the dilution ratio of the soap to water by controlling the quantity of the metallic soap metered into the pressurized water stream. This quantity of metallic soap is correlative with the speed of the planar surface, so as to maintain a relatively constant measure of metallic soap per unit of surface area as the speed of the planar surface is increased or decreased.

28 Claims, 3 Drawing Sheets

APPARATUS FOR DISTRIBUTING A RELEASE AGENT FOR USE IN THE MANUFACTURE OF LIGNO-CELLULOSIC COMPOSITE MATERIALS

FIELD OF THE INVENTION

The subject invention relates to a process and apparatus for supplying a release agent, and in particular to use of the process and apparatus in the manufacture of oriented strand board and other ligno-cellulosic composite materials.

BACKGROUND OF THE INVENTION

Ligno-cellulosic composite materials are commonly prepared by hot pressing a mat formed from multiple layers of wood "flakes" or "strands," coated with a binding material such as phenol formaldehyde resin or isocyanate resin, together with a wax, to form a composite panel. The hot press is typically characterized by two steel press plates that compress the mat at a predetermined temperature and pressure. Examples for the fabrication of ligno-cellulosic composites are described in U.S. Pat. No. 5,525,394 to Clarke et al., and U.S. Pat. No. 5,635,248 to Hsu et al., the complete contents of each is herein incorporated by reference.

Organic polyisocyanates, such as methylene diphenyl diisocyanate (MDI) are known to be superior binders for use with ligno-cellulosic material, due to the superior strength and adhesion properties these binders impart on the composite panel. However, ligno-cellulosic strands coated with organic polyisocyante binders tend to stick to the metal surface of the press plates when the mat is pressed. Often the final product is damaged during removal of the mat from the press and significant time is required to remove the ligno-cellulosic material from the surfaces of the press plates.

To avoid such adhesion problems, other binding agents, such as phenol formaldehyde, are often used on the faces of the boards to be produced. These binding agents generally diminish the adherence of the coated ligno-cellulosic material to the surfaces of the press plates. Another solution to the binding problem is to face the ligno-cellulosic material with paper. Unfortunately, these options increase the complexity and cost of the manufacturing process.

Attempts to solve the adhesion problems that occur with organic polyisocyante binders has tended to focus on the use of release agents such as oils, wax polishes, metallic soaps, silicones and polytetrafluoroethylene. These agents may be used internally, i.e., as an emulsion or mixture with the organic polyisocyanate, or externally, i.e., applied to the metal surfaces of the press plates, to the ligno-cellulosic material itself or to the belts underneath and/or above the ligno-cellulosic material which guide the mat into the press plates. In general, these release agents, and their method of application, have not demonstrated significant improvement in release properties or have proven to be too expensive or detrimental to the physical properties of the resulting product. For example, many external release agents, such as metallic soaps, will cause discoloration of the ligno-cellulosic product or evaporate off of the surface to which they are applied, prior to entering the pressing operation. In addition, external wax release agents, particularly petroleum derived wax release agents, tend to coat and "gum-up" the moving parts of the machinery. Specifically, the high temperatures at which the press platens operate cause these agents to caramelize.

Thus, there is a need in the wood product manufacturing industry for a process and apparatus for efficiently applying a release agent to provide a means for producing ligno-cellulosic composite made exclusively with an organic polyisocyante binder, while eliminating adhesion of the coated wood strands to the press plates. Further, there is a need for a means to economically apply such a release agent, while avoiding the discoloration of the final ligno-cellulosic product and adhering of the releasing agent to the moving parts of the wood product manufacturing equipment.

SUMMARY OF THE INVENTION

In summary, the invention includes apparatus for distributing a soap based release agent, preferably a metallic soap, upon a surface comprising; a means for metering a controlled quantity of a liquid metallic soap into a pressurized water stream to form a pressurized aqueous solution having a controlled dilution ratio of soap to water, at least one manifold connected to receive the pressurized aqueous solution, and a plurality of nozzles mounted upon the manifold to uniformly distribute the pressurized liquid solution upon at least one surface. The surface may further be defined as a planar surface, moving unidirectional along a fixed path at a predetermined variable speed and defined by a surface area of length multiplied by width. The planar surface has a fixed width, wherein the surface area moving past a fixed point for a predetermined period of time is a function of the speed of the planar surface moving past the fixed point. Preferably, the apparatus further comprises at least one regulating means for regulating the dilution ratio of the soap to water. The dilution ratio is controlled by regulating the quantity of the metallic soap metered into the pressurized water stream. This quantity of metallic soap is correlative with the speed of the planar surface, so as to maintain a relatively constant measure of metallic soap per unit of surface area as the speed of the planar surface is varied. Thus, the dilution ratio is adjusted to maintain a relatively constant measure of metallic soap per square foot of surface area during increases or decreases in surface speed.

The invention, by way of summary, also includes apparatus for manufacturing orientated strand board comprising:

(1) a means for coating wood strands with at least one organic polyisocyanate binder, (2) a means for forming a mat of said coated wood strands, (3) a device for distributing a release agent upon said mat and a conveyer belt used to transport said mat, said device comprising;

(a) a means for metering a controlled quantity of a soap based release agent into a pressurized water stream to form a pressurized aqueous solution having a controlled dilution ratio of soap to water;

(b) at least one manifold connected to receive said pressurized aqueous solution;

(c) a plurality of nozzles mounted upon said manifold to uniformly distribute said pressurized liquid solution upon said mat and said belt, and (4) means for hot pressing said mat to bind and shape said coated wood strands.

A feature of this invention is that the apparatus for distributing a release agent eliminates severe sticking of ligno-cellulosic material, coated with an organic polyisocyanate binder, to the metal surface of the press plates and/or the steel mesh conveyor belts. Moreover, the even distribution of a controlled quantity of metallic soap prevents the undesirable discoloring of the surface of the final product. In addition, unlike wax release agents, the metallic soaps employed in this invention do not adhere and interfere with the moving parts of the wood product manufacturing equipment, thus reducing maintenance time and increasing product output.

Other objects, features and advantages will be readily apparent from the following detailed description of preferred embodiments thereof.

DETAILED DESCRIPTION OF THE INVENTION

Figure 1:
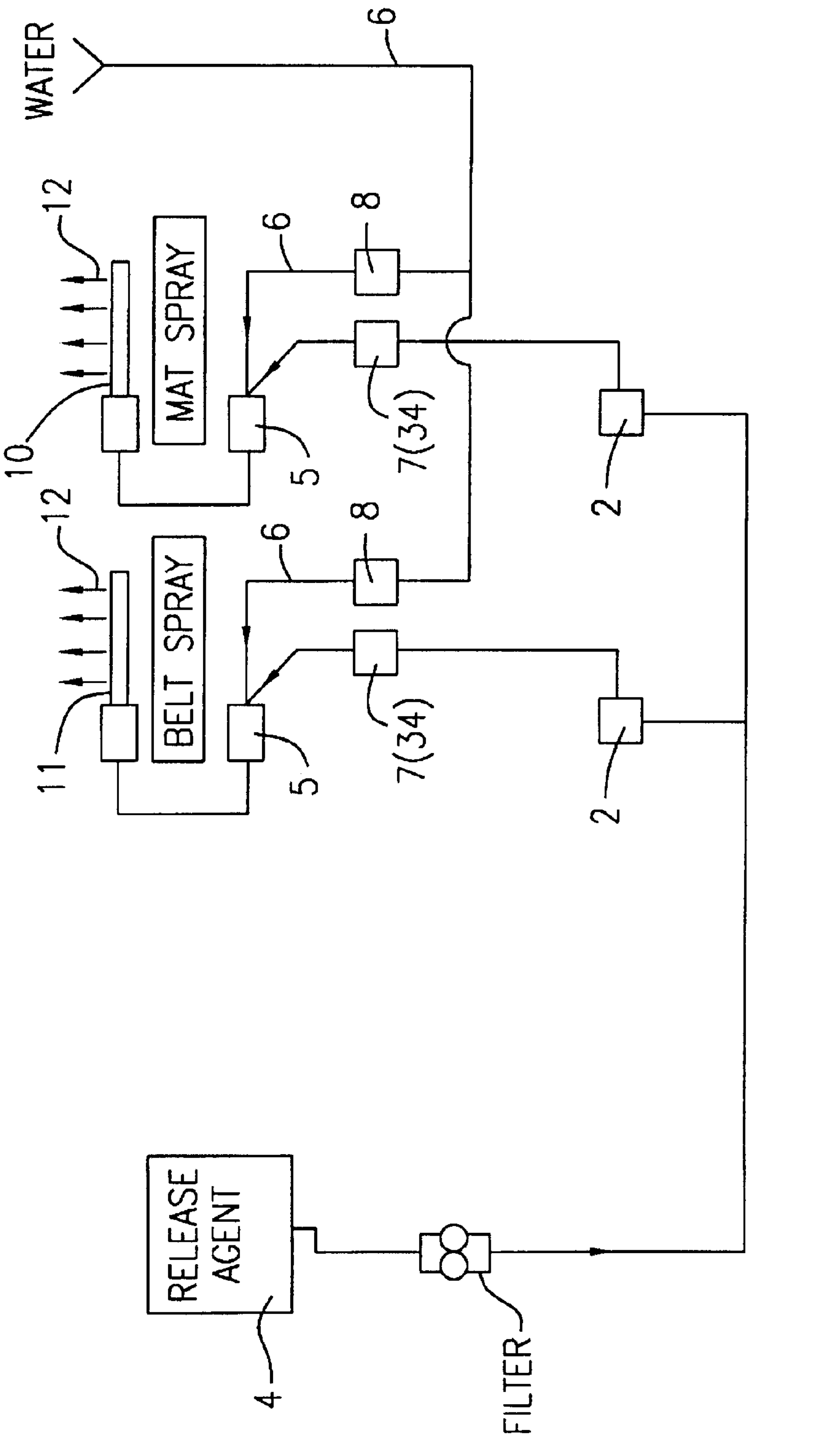
FIG. 1 is a block diagram representing a preferred embodiment of the invention wherein a release agent is distributed upon both the surface of a layered mat of wood materials and a the surface of the underlying conveyer belt.

The present invention relates to apparatus for distributing a release agent during the manufacture of ligno-cellulosic composite panels such as oriented strand board, waferboard, chipboard, fiberboard, etc. Hereinafter only oriented strand board or OSB will be referred to, but it should be understood that the other "boards" may be substituted as equivalents.

Oriented strand board contains multiple layers of wood "flakes" or "strands" bonded together by a binding material such as phenol formaldehyde resin or isocyanate resin together with sizing materials such as paraffinic waxes. The flakes are made by cutting thin slices with a knife edge parallel to the length of a debarked log. Typically, the raw wood starting materials, either virgin or reclaimed, are cut into strands, wafers or particles of desired size and shape. These ligno-cellulosic wood materials can be "green" (e.g., having a moisture content of 5–30% by weight) or dried, wherein the dried materials have a moisture content of about 2–10 wt %. The flakes are typically 0.01 to 0.5 inches thick, although thinner and thicker flakes can be used in some applications, and are typically less than one inch to several inches long and less than one inch to a few inches wide. The flakes typically are longer than they are wide. In the fabrication of oriented strand board, the flakes are first dried to remove water, then coated with a thin layer of binder and sizing material.

Various polymeric resins, preferably thermosetting resins, may be employed as a binder for the wood strand materials. The resin loading level is preferably between 1–10 wt %, based upon the oven-dried wood weight, more preferably 2–6 wt %. The use of organic polyisocyanate binders provide OSB products which demonstrate high strength, high modulus of elasticity, high modulus of rupture and low edgeswell qualities. Accordingly, OSB made entirely from organic polyisocyanate binders, other wise known as "all MDI" OSB panels, are preferred, because of their increased structural performance. Moreover, the strength and stability of all MDI OSB panels provides an attractive and effective alternative to plywood in many applications. Preferably, isocyanate-based binder materials, such as methylene diphenyl diisocyanate (MDI) and polymeric methylene diphenyl diisocyanate (pMDI), are used.

In general, the binder and sizing material are mixed with the wood strands in a drum blender. The coated flakes are then spread on a conveyor belt in a series of alternating layers, where one layer will have the flakes oriented generally in line with the conveyor belt, and the succeeding layer of flakes oriented generally perpendicular to the conveyor belt, such that alternating layers have flakes oriented generally perpendicular to one another. The word "strand" is used to signify the cellulosic fibers which make up the wood, and, because the grain of the wood runs the length of the wood flake, the "strands" in the oriented strand board are oriented generally perpendicular to each other in alternating layers. The number of layers will vary depending on the application and desired thickness of oriented strand board to be produced. Typically, the mat will be 1 to 20 inches thick. The layers of oriented "strands" or "flakes" are finally subjected to heat and pressure to fuse the strands and binder together. Preferably, the panels are pressed for 2–5 minutes at a temperature of 350–450° F. and the resulting composite panels have a thickness of about 0.25 (¼") to about 1.5 (1½") inches.

Commonly, composite panels, such as oriented strand board, are made almost continuously so that the mats are continuously entering and exiting the pressing operation. In one manner, the layered mat is carried upon a stainless steel mesh conveyer belt or screen, which carries the mat between two aluminum or steel press platens. The heated platens press directly upon the surface of the mat and the underlying conveyer belt, thereby binding the strands together.

Another type of pressing operation employs continuous belts to move materials through the pressing step, a conveyor moves the mat through two opposing, closely spaced belts which press the flakes together. A pair of heated plates or a heated moveable ram and an opposing table are positioned behind the opposing, closely spaced belts, and provide heat and additional pressing forces. Thus, as the mat is moved through the opposing, closely spaced belts, the wood fibers are pressed together both by the belts and by the plates or ram, and the binder and filler are heated to a point where the individual wood flakes or "strands" are fused to form a continuous flake board or "strand" board product. A screen belt may be utilized upon the top surface of the mat to create a screen imprint upon the surface of the panel. Examples of continuous belt presses for making oriented strand board can be found in U.S. Pat. No. 5,520,530 to Siempelkamp and U.S. Pat. No. 5,596,924 to Gerhardt, and an example of a continuous production process to form particleboard or fiberboard is described in U.S. Pat. No. 5,538,676 to Biefeldt, and the complete contents of each of these patents is herein incorporated by reference.

Regardless of the press operation employed, a release agent is applied to the surface of the wood mat and/or the belts to serve as an interface between the mat surface and the steel mesh belts and/or the press plates. The release agent prevents the coated wood strands from mechanically bonding to the metal surface of the press plates and belts.

The invention herein provides an apparatus for efficiently applying a soap based release agent, preferably a metallic soap, which prevents the coated wood strands from mechanically bonding to the metal press platens and/or the steel mesh conveyor belts.

The term "metallic soap" relates to metal salts of long chain aliphatic or cycloaliphatic acids. Such metal salts include alkali metal salts. Suitable metals include aluminum, barium, cadmium, lithium, magnesium, potassium, zinc, calcium, cobalt, copper, maganese and iron.

Preferably, the aliphatic acid is a long chain fatty acid, such as 10 carbon atoms and not more than 26 carbon atoms. The most suitable and readily available fatty acids contain between 12 and 18 carbon atoms. A preferred metallic soap release agent is 8315 ® Release Agent sold by Hercules Incorporated, which comprises an aqueous solution containing approximately 22% of a potassium salt of tall-oil fatty acid. Alternatively, the metal soaps may be metal stearates, in particular zinc, calcium or aluminum stearates. The nature and concentration of the metallic release agent desired may vary depending on the OSB panel manufacturing process, the type of binder resin utilized and/or the characteristics of the wood from which the wood strands are derived.

FIG. 1 is a diagram representing a preferred embodiment of the invention wherein a release agent is distributed upon both the surface of a layered mat of wood materials and the surface of the underlying conveyer belt which transports the mat into the pressing operation. A means 2 for metering a controlled quantity of a liquid metallic soap from a holding tank 4 discharges the liquid metallic soap into a pressurized water stream 6. Preferably, the means for metering is a liquid pump, which adds to the existing pressure of the liquid soap to an increment sufficient to meter the soap into the water stream. However, any means sufficient to transport controlled liquid quantity of the liquid metallic soap into the water stream, such as a regulated gravity or pressure feed, may be used. Preferably, the water stream is a pressurized water stream drawn from a local city or municipal water source wherein a regulator 8 is employed to adjust the pressure as desired. The pressure of the water stream is preferably between 35–45 pounds per square inch (psi). A venturi effect is created by the flow of the water stream 6 which both aides the pump 2 by drawing the liquid metallic soap into the water stream and mixes the soap and water into an aqueous solution. Further, inline mixers 5, positioned subsequent to the combination of the water and soap, assist in the blending of the aqueous solution. The dilution ratio of soap to water is controlled by the quantity of metallic soap metered into the pressurized water stream 6.

The pressurized aqueous solution is transported to a first and second manifold 10 and 11 containing a plurality of nozzles 12 mounted upon the manifolds to uniformly distribute the aqueous solution upon a first and second surface. In the preferred embodiment, the first surface is the top planar surface of a mat formed from layered ligno-cellulosic materials coated with a polyisocyanate binder. The second surface is the top surface of a steel mesh conveyer belt, upon which the mat rests, utilized to transport the mat into the pressing operation during a continuous OSB manufacturing process. Generally, the surface of the mat and the top surface of the belt are coated with the aqueous solution prior to the mat being transported upon the belt. Once the coated mat is placed upon the coated belt, both the mat and the belt enter between two heated steel press plates which compress the mat to bind the coated ligno-cellulosic materials. The aqueous solution of metallic soap and water serves as an interface between both the mat surface and steel press plates, and the mat and the steel belt, so that the compressed panel may be easily released from the press plates and the belt.

Preferably, the mat and belt are of a predetermined width, preferably 8–10 feet wide and move at a variable speed during the continuous OSB manufacturing process. Accordingly, as the belt speed is increased or decreased, the surface area of the mat and belt passing a fixed point will increase or decrease respectively.

The speed of the mat and the belt, i.e., “belt speed” moving past a fixed point, will be varied depending on the final thickness desired for the OSB panel, the curing factor of the resin employed, moisture content of the wood strands and the type of wood used. Temperature of the pressing operation and thickness of the panel will, in turn, effect the curing factor of the resin. Thus, the belt speed is influenced by a number of interrelated factors. Preferably, the belt speed operates in the range of 19 to 136 feet per minute.

The measure of metallic soap needed to effectively prevent adhesion of the organic polyisocyanate binder to the press plates is dependent on the type of soap employed, the resin loading level and the nature of the surface to which the soap is applied. Employing the 22% potassium salt 8315 ® release agent previously mentioned, the smooth and non-absorptive surface of the conveyer belts require 0.15–0.35 grams of metallic soap per square foot, and preferably, a range of 0.2–0.3 grams per square foot. As regards the surface of the mat, 0.8–1.2 grams of the preferred metallic soap per square foot is employed, more preferably a range of 0.9–1.1 grams per square foot. These measures were found to be effective at MDI resin loading levels in the range of about 4–6 wt %. Employing alternative metallic soaps of varying concentration may require adjustments in the measure of metallic soap applied to effectively prevent adhesion of the organic polyisocyanate binder to the press plates. Moreover, where the nature of the surfaces differ, more than one regulating means is employed to maintain the required measure of metallic soap to be distributed upon each-surface.

In the preferred embodiment, the volume of the aqueous solution distributed through the manifold and nozzles remains relatively constant during changes in belt speed. Preferably, the volume is 0.8 to 1.1 gal per minute per 8 to 10 feet of surface width, respectively. With the volume of the aqueous solution relatively constant, the measure of metallic soap applied to a given surface area is regulated by controlling the quantity of metallic soap metered into the water stream. This quantity of metallic soap is used to control the concentration of soap to water in the aqueous solution, i.e., the dilution ratio of soap to water.

Since the surface area of a mat or belt moving past a fixed point is a function of belt speed, so too will the quantity of metallic soap metered into the water stream be a function of belt speed. Therefore, as belt speed is increased or decreased, the dilution ratio is adjusted to maintain a relatively constant measure of metallic soap per square foot of surface area. For example, as the belt speed is increased from 19 to 136 feet per minute for the preferred embodiment, the dilution ratio will be adjusted as necessary to maintain a relatively constant distribution of 0.15–0.35 grams per square feet of the preferred metallic soap on the surface of the conveyer belt. As for the mat, the dilution ratio will be adjusted to maintain a distribution of 0.8–1.2 grams per square feet of the preferred metallic soap during changes in belt speed. Throughout, the volume of the aqueous solution distributed upon the belt and mat remains constant during variation of belt speed. In general, the belt speed is preset, thus the quantity of metallic soap metered into the water stream is preset accordingly to correspond to the preset belt speed.

Figure 5:
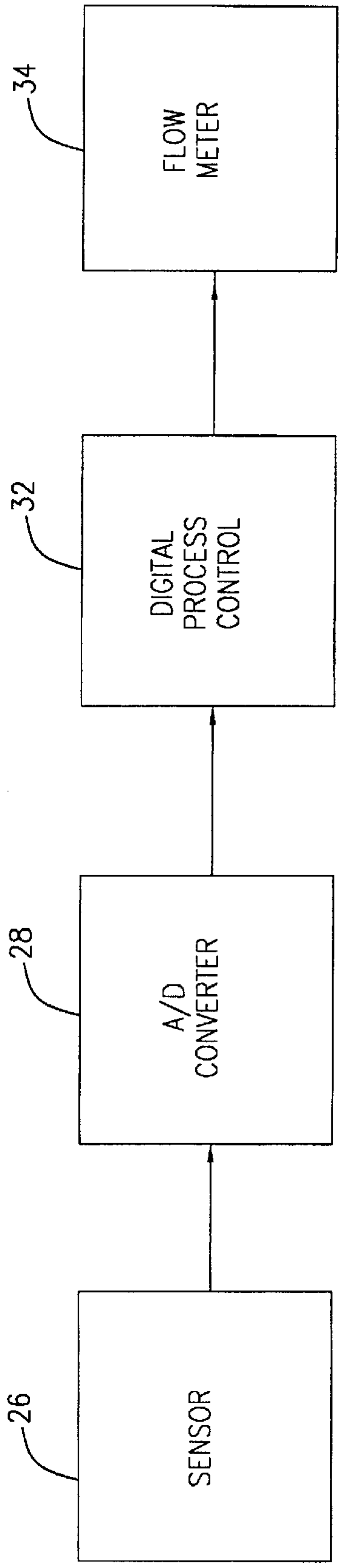
FIG. 5 is a schematic diagram of the automatic control system utilized in the preferred embodiment of the invention.

The preferred embodiment further comprises an electronically controlled regulating means 7, positioned before or after the pump means 2, to regulate the quantity of metallic soap metered into the water stream, the regulation being responsive to variations in belt speed. As illustrated in FIG. 1, the regulating means 7 is preferably positioned subsequent to the pump means 2. Although belt speed is preset based on operating conditions, slight variations in belt speed during operation may necessitate variations in the dilution ratio to maintain a constant measure of metallic soap per square foot of surface area. In the preferred embodiment, the regulating means 7 comprises an automatic control system to regulate the quantity of soap dispensed in response to a control signal received from a speed sensor 26 (FIG. 2) which monitors the belt speed. Preferably, as shown in FIG. 5, an analog signal 24 from the sensor 26, in the form of a continuous voltage or current output, is converted into a digital representation by an analog-to-digital converter 28. The digital signal 30 from the analog-to-digital converter is received by a digital process control 32 computer which actuates a 4 to 20 milliamp flow meter 34 to regulate the quantity of metallic soap metered into the water stream. In particular, the preferred control system is a closed loop proportional plus integral plus derivative (PID) control system.

Figure 2:
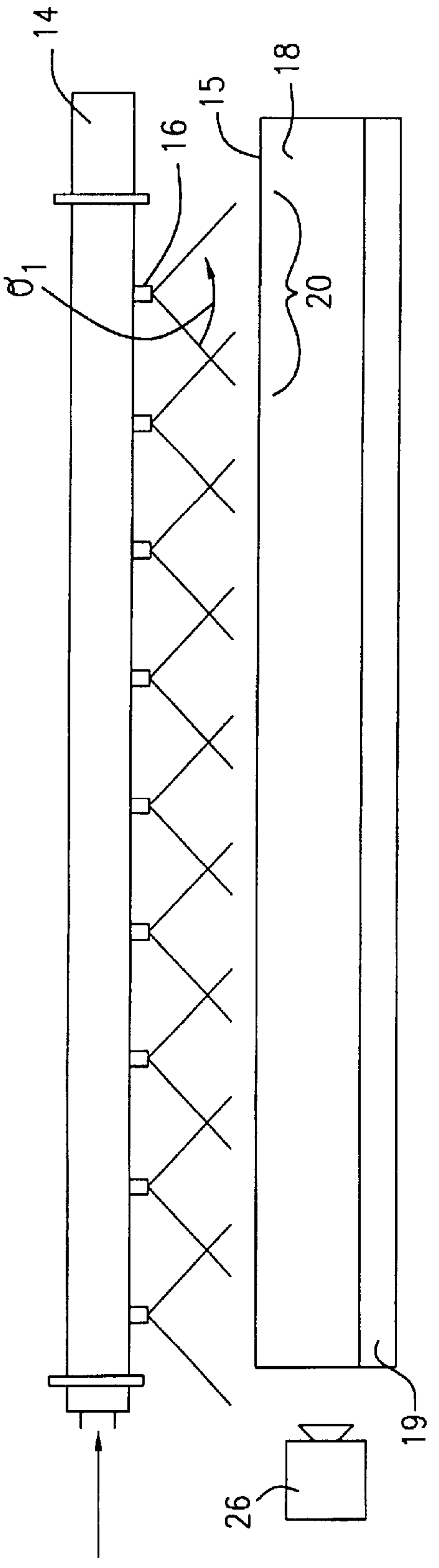
FIG. 2 illustrates a frontal view of a manifold and a plurality of nozzles mounted thereupon for the preferred embodiment of this invention.

FIG. 2 illustrates a frontal view of a manifold and a plurality of nozzles mounted thereupon, for the preferred embodiment of this invention. The manifold 14 is situated above the mat surface 18 and a plurality of nozzles 16 are evenly spaced along the manifold facing downward towards the surface of the mat is resting upon a screen belt. The spray tips of the nozzles are positioned at a distance adjacent from each other and a distance away from the mat surface, so that the spray pattern 20 from one nozzle will slightly overlap the spray pattern of the adjacent nozzles. In this regard, a flat fan spray pattern with a fan having an angle $\theta_1$ of 90° to 110° from the nozzle tip is preferred. The angle of the spray pattern will impact the distance at which the nozzles are maintained above the mat. The preferred pressure at the nozzle tip is between 35–45 psi. The diameter of the orifice at the nozzle tip, the angle of the spray pattern and the pressure may be varied individually or together. Generally, an adjustment or change in one of the above variables, will result in a need to change the other variables. For example, when the pressure is increased, the orifice may need to be decreased in order to maintain a constant volume. In turn, a pressure decrease may effect spray angle, thereby requiring an increase in orifice diameter and a change in the distance between the nozzle and the mat. In the preferred embodiment, a pressure of 40 psi was maintained for a nozzle orifice of 0.026 inches in diameter to effectively distribute approximately 0.1 gallons per minute of aqueous solution for each nozzle in a 110° flat fan spray. Using these parameters, eleven nozzles were evenly spaced at approximately 9.625 inches from tip to tip at a distance of 4.07 inches from a mat surface 105 inches wide to uniformly distribute 1.1 gallons per minute of aqueous solution across the mat surface 18 moving below the nozzle tip wherein the spray overlap was approximately 2 inches.

Regardless of nozzle type, orifice size, spray pattern or nozzle spacing, the nozzles employed should be capable of effectively atomizing and evenly distributing the pressurized aqueous solution upon the intended surface.

Furthermore, it is preferred that the nozzles have a control valve which opens unidirectional at a minimum pressure level. In this way, during non-operation of the release agent spray system, the control valves in the nozzles will close, thus preventing the residual aqueous solution from leaking out from the nozzle tips. Upon enabling the system, the pressure of the aqueous solution in the manifold opens the valves to allow the solution to pass freely through the nozzle orifice. Preferred nozzles are ¼ inch VeeJet SS 11001, 110° flat fan nozzles.

Figure 3:
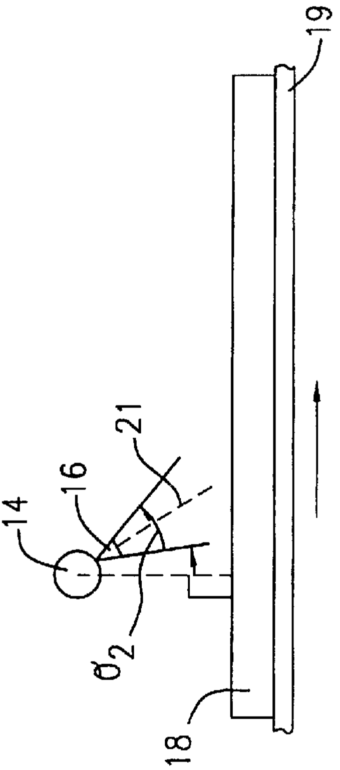
FIG. 3 is a side view of the manifold and nozzles illustrated in FIG. 2.

FIG. 3 is a side view of the manifold 14 and nozzles 16 illustrated in FIG. 2. When the aqueous solution is sprayed perpendicular to the mat surface, the solution will penetrate the layered mat rather than remain on the mat surface. Conversely, if the solution is sprayed at an angle too large from the perpendicular, the coverage will be ineffective, or the wood strands may be shuffled from the spray pressure. Accordingly, it is preferred that the angle $\theta_2$ of the spray be 15° to 65°, preferably 20° to 50° from the perpendicular of the mat surface 18. Further, it is preferred that the angle of the spray be oriented in an direction similar to the movement of the mat.

Figure 4:
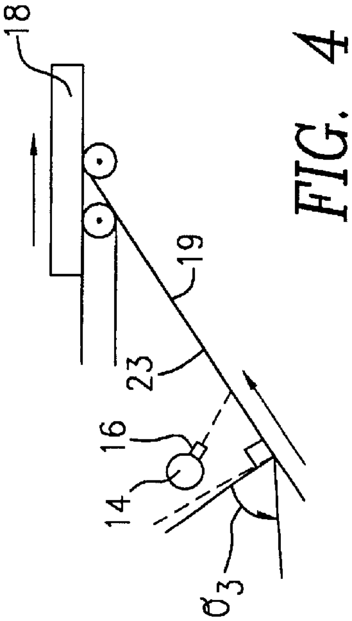
FIG. 4 is a side view of the manifold and nozzles of the preferred embodiment employed to distribute the release agent upon the bottom surface of the conveyer belt.

FIG. 4 is a side view of the manifold 14 and nozzles 16 of the preferred embodiment employed to distribute the release agent upon the top surface of the conveyer belt 19. Preferably, the angle of the spray $\theta_3$ is not perpendicular to the belt, but rather at an angle oriented in a direction similar to the movement of the belt. Preferably, the angle is 20° to 80° from the perpendicular of the belt surface.

While the invention has been described in terms of its preferred embodiments, those skilled in the art will recognize that the invention can be practiced with modification within the spirit and scope of the appended claims. By way of example, and not limitation, the apparatus for distributing a release agent described above may be utilized in the production of other engineered wood products such as wood composite lumber, rim board, webstock, particleboard and fiberboard.

We claim:

1. An apparatus for distributing a release agent comprising:

a means for producing a pressurized stream of water means for metering a controlled quantity of a metallic soap release agent into a pressurized water stream to form a pressurized aqueous solution having a controlled dilution ratio of soap to water;

at least one manifold connected to receive said pressurized aqueous solution;

a plurality of nozzles mounted upon said manifold to uniformly distribute said pressurized aqueous solution upon at least one surface, said surface is a moving planar surface moving unidirectionally along a fixed path at a predetermined variable speed and defined by a surface area of length multiplied by width, said planar surface having a fixed width wherein the surface area moving past a fixed point for a predetermined period of time is a function of the speed of the planar surface moving past said point; and an automatic control system for controlling the quantity of said metallic soap correlative with the speed of the planar surface.

2. An apparatus according to claim 1 wherein said automatic control system is a closed proportional integral control system.

3. An apparatus according to claim 2 wherein said apparatus is used in the manufacture of ligno-cellulosic composite materials.

4. An apparatus according to claim 3 wherein said ligno-cellulosic composite materials are oriented strand board panels made exclusively using an organic polyisocyanate binder.

5. An apparatus according to claim 2 wherein said surface comprises two opposing belts which transport a mat formed from a quantity of wood materials coated with a polyisocyanate binder and a wax, said opposing belts transporting said mat into a heated press during the continuous manufacture of oriented strand board panels.

6. An apparatus according to claim 2 wherein said apparatus comprises two regulating means for individually controlling the dilution ratio of soap and water for two moving planar surfaces.

7. An apparatus according to claim 6 wherein said two moving planar surfaces comprise a first surface and second surface, said first surface is the surface of a mat formed from a quantity of wood materials coated with a polyisocyanate binder and a wax, said second surface is a steel mesh conveyer belt upon which the mat is transported into a heated press during the continuous manufacture of oriented strand board panels.

8. An apparatus according to claim 7 wherein the measure of metallic soap distributed per unit of surface area on said first surface is 0.8–1.2 grams per square foot and the measure of metallic soap distributed per unit of surface area on said second surface is 0.15–0.35 grams per square foot.

9. An apparatus according to claim 7 wherein the measure of metallic soap distributed per unit of surface area on said first surface is 0.9–1.1 grams per square foot and the measure of metallic soap distributed per unit of surface area on said second surface is 0.2–0.3 grams per square foot.

10. An apparatus according to claim 1 wherein said means for metering said liquid soap is a pump.

11. An apparatus according to claim 1 wherein said metallic soap is an aqueous solution of a potassium salt of a long chain aliphatic or cycloaliphatic acid.

12. An apparatus according to claim 11 wherein said metallic soap is an aqueous solution of a potassium salt of a tall-oil fatty acid.

13. An apparatus according to claim 1 wherein said metallic soap is an aqueous solution of a metal stearate selected from the group consisting of zinc, calcium and aluminum stearates.

14. An apparatus for manufacturing orientated strand board comprising:

(1) a means for coating wood strands with at least one organic polyisocyanate binder, (2) a means for forming a mat of said coated wood strands, (3) a device for distributing a release agent upon said mat and a conveyer belt used to transport said mat, said device comprising;

(a) a means producing a pressurized stream of water;

(b) a means for metering a controlled quantity of a soap based release agent into a pressurized water stream to form a pressurized aqueous solution having a controlled dilution ratio of soap to water;

(c) at least one manifold connected to receive said pressurized aqueous solution;

(d) a plurality of nozzles mounted upon said manifold to uniformly distribute said pressurized aqueous solution upon said mat and said belt, wherein mat and said belt move unidirectionally along a fixed path at a predetermined variable speed and wherein said mat and said belt are defined by a surface area of length multiplied by a fixed width, such that the surface are of the mat and the belt moving past a fixed point for a predetermined period of time is a function of the speed at which said mat and said belt move past said point;

(4) means for hot pressing said mat to bind and shape said coated wood strands into a composite board.

(5) at least one regulating means for regulating the dilution ratio of said soap to water by regulating the quantity of said soap metered into the pressurized water stream, said quantity of soap being correlative with the speed of the planar surface so as to maintain a relatively constant measure of soap per unit of surface area as the speed said mat and said belt is varied; and (6) an automatic control system for controlling the quantity of said soap correlative with the speed of said mat and said belt.

15. An apparatus according to claim 14 wherein said automatic control system is a closed proportional integral control system.

16. An apparatus according to claim 15 wherein said device comprises two regulating means for individually controlling the dilution ratio of soap and water for said mat and said belt.

17. An apparatus according to claim 14 wherein said soap based release agent is a metallic soap release agent.

18. An apparatus according to claim 17 wherein the measure of metallic soap distributed per unit of surface area on said mat is 0.8–1.2 grams per square foot and the measure of metallic soap distributed per unit of surface area on said belt is 0.15–0.35 grams per square foot.

19. An apparatus according to claim 17 wherein the measure of metallic soap distributed per unit of surface area on said mat is 0.9–1.1 grams per square foot and the measure of metallic soap distributed per unit of surface area on said belt is 0.2–0.3 grams per square foot.

20. An apparatus according to claim 17 wherein said metallic soap is an aqueous solution of a potassium salt of a long chain aliphatic or cycloaliphatic acid.

21. An apparatus according to claim 20 wherein said metallic soap is an aqueous solution of a potassium salt of a tall-oil fatty acid.

22. An apparatus according to claim 14 wherein said device distributes said release agent upon two opposing belts designed to transport the mat.

23. An apparatus according to claim 14 wherein the volume of said pressurized aqueous solution distributed upon said surface is relatively constant.

24. An apparatus according to claim 23 wherein the pressure of said aqueous solution is 35–45 psi.

25. An apparatus for distributing a release agent comprising:

a means for producing a pressurized stream of water means for metering a controlled quantity of a release agent into a pressurized water stream to form a pressurized aqueous solution having a controlled dilution ratio of release agent to water;

at least one manifold connected to receive said pressurized aqueous solution;

a plurality of nozzles mounted upon said manifold to uniformly distribute said pressurized aqueous solution upon at least one surface, said surface is a moving planar surface moving unidirectionally along a fixed path at a predetermined variable speed and defined by a surface area of length multiplied by width, said planar surface having a fixed width wherein the surface area moving past a fixed point for a predetermined period of time is a function of the speed of the planar surface moving past said point; and an automatic control system for controlling the quantity of said release agent correlative with the speed of the planar surface.

26. The apparatus according to claim 25 wherein said release agent is a soap-based release agent.

27. An apparatus for manufacturing orientated strand board comprising:

(1) a means for coating wood strands with at least one organic polyisocyanate binder, (2) a means for forming a mat of said coated wood strands, (4) a device for distributing a release agent upon said mat and a conveyer belt used to transport said mat, said device comprising;

(a) a means producing a pressurized stream of water;

(b) a means for metering a controlled quantity of a release agent into a pressurized water stream to form a pressurized aqueous solution having a controlled dilution ratio of release agent to water;

(c) at least one manifold connected to receive said pressurized aqueous solution;

(d) a plurality of nozzles mounted upon said manifold to uniformly distribute said pressurized aqueous solution upon said mat and said belt, wherein mat and said belt move unidirectionally along a fixed path at a predetermined variable speed and wherein said mat and said belt are defined by a surface area of length multiplied by a fixed width, such that the surface are of the mat and the belt moving past a fixed point for a predetermined period of time is a function of the speed at which said mat and said belt move past said point;

(4) means for hot pressing said mat to bind and shape said coated wood strands into a composite board.

(5) at least one regulating means for regulating the dilution ratio of said release agent to water by regulating the quantity of said release agent metered into the pressurized water stream, said quantity of release agent being correlative with the speed of the planar surface so as to maintain a relatively constant measure of release agent per unit of surface area as the speed said mat and said belt is varied; and (6) an automatic control system for controlling the quantity of said release agent correlative with the speed of said mat and said belt.

28. The apparatus according to claim 27 wherein said release agent is a soap-based release agent.

* * * * *